United States Patent [19]
Smith

[11] 4,416,618
[45] Nov. 22, 1983

[54] GAS-FIRED INFRA-RED GENERATORS AND USE THEREOF

[76] Inventor: Thomas M. Smith, 114 Villinger Ave., Cinnaminson, N.J. 08077

[21] Appl. No.: 279,081

[22] Filed: Jun. 30, 1981

Related U.S. Application Data

[63] Continuation-in-part of Ser. No. 238,418, Feb. 26, 1981, Ser. No. 186,491, Sep. 12, 1980, Pat. No. 4,378,207, Ser. No. 178,121, Aug. 14, 1980, Pat. No. 4,373,904, Ser. No. 20,079, Mar. 13, 1979, Pat. No. 4,290,746, and Ser. No. 952,332, Oct. 18, 1978, Pat. No. 4,326,843, said Ser. No. 20,079, and Ser. No. 952,332, each is a continuation-in-part of Ser. No. 906,229, May 15, 1978, Pat. No. 4,157,155, said Ser. No. 20,079, Ser. No. 186,491, Ser. No. 952,332, and Ser. No. 178,121, each is a continuation-in-part of Ser. No. 863,251, Dec. 22, 1977, Pat. No. 4,224,018, said Ser. No. 238,418, Ser. No. 20,079, Ser. No. 186,491, Ser. No. 952,332, and Ser. No. 178,121, each is a continuation-in-part of Ser. No. 94,901, Nov. 16, 1979, Pat. No. 4,272,238, and Ser. No. 775,838, Mar. 9, 1979, Pat. No. 4,272,237.

[51] Int. Cl.³ .............................................. F23D 13/12
[52] U.S. Cl. ................................................... 431/328
[58] Field of Search ................... 431/7, 170, 326, 328, 431/329

[56] References Cited

U.S. PATENT DOCUMENTS

| 3,173,470 | 3/1965 | Wright | 431/328 |
| 3,188,366 | 6/1965 | Flynn | 431/329 |
| 3,785,763 | 1/1974 | Bratko | 431/328 |
| 3,824,064 | 7/1974 | Bratko | 431/328 |
| 4,035,132 | 7/1977 | Smith | 431/328 X |
| 4,189,297 | 2/1980 | Bratko et al. | 431/328 |
| 4,224,018 | 9/1980 | Smith | 431/328 |
| 4,252,520 | 2/1981 | Bratko | 431/328 |
| 4,272,237 | 6/1981 | Smith | 431/328 |

FOREIGN PATENT DOCUMENTS

| 2306009 | 8/1974 | Fed. Rep. of Germany | 431/328 |
| 1433771 | 4/1976 | United Kingdom | 431/328 |

Primary Examiner—Samuel Scott
Assistant Examiner—Margaret A. Focarino
Attorney, Agent, or Firm—Connolly & Hutz

[57] ABSTRACT

Gas-fired infra-red generators with porous ceramic fiber panels through the thickness of which combustion mixture flows and on the emerging surface of which it burns, have constructions that enable a group to be mounted close together, and have various arrangements to reduce the temperature of the burner mouth in which the panels are mounted. Self-contained electric ignition and auxiliary radiation from added panels heated by the hot combustion gases is also shown.

8 Claims, 21 Drawing Figures

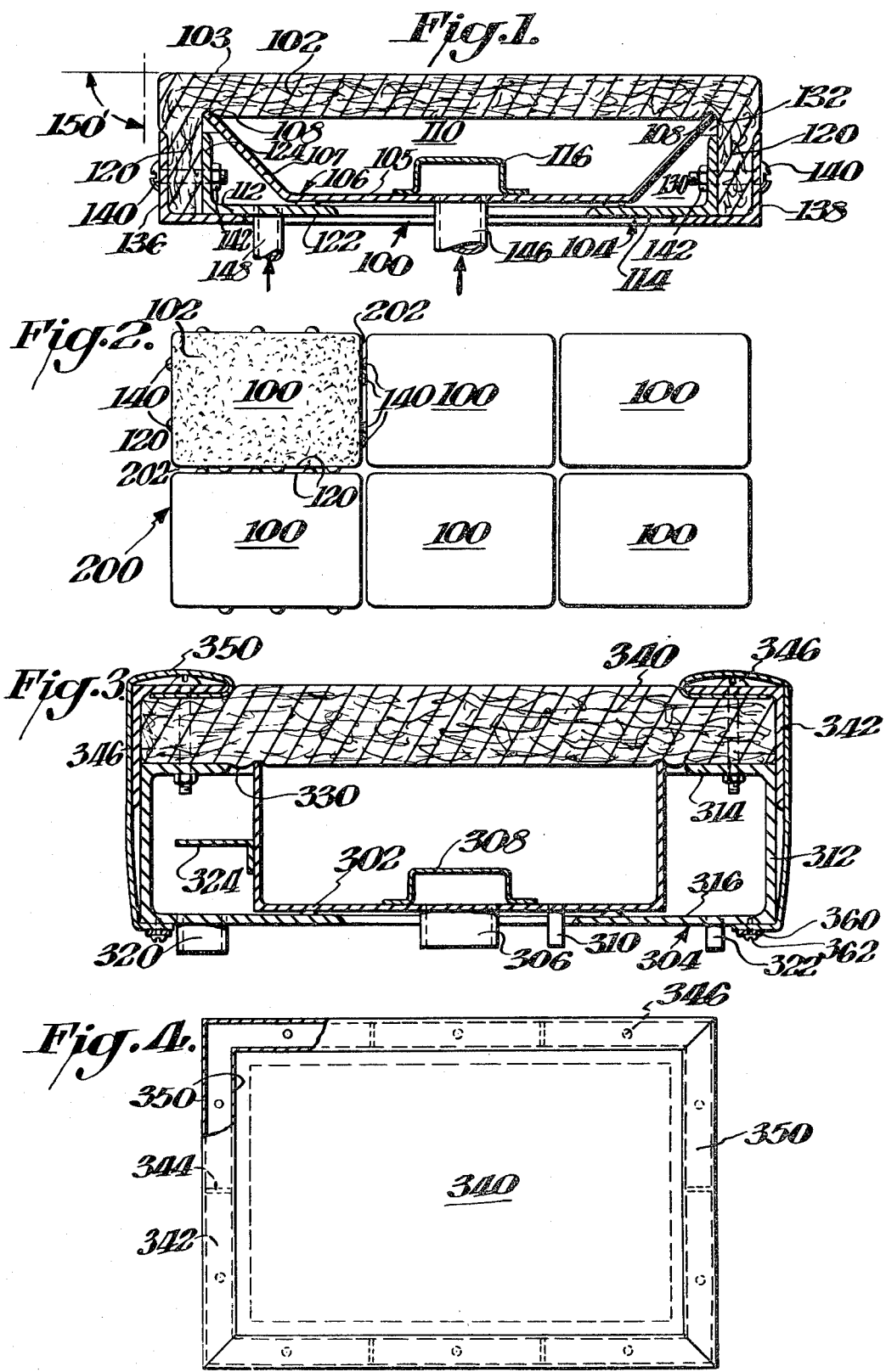

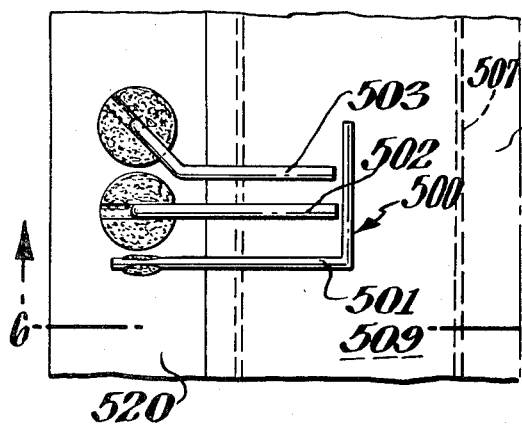
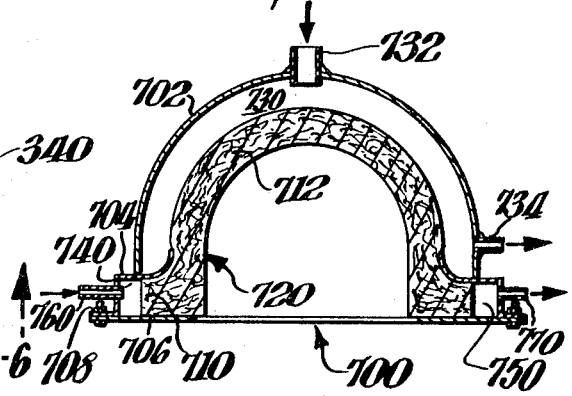
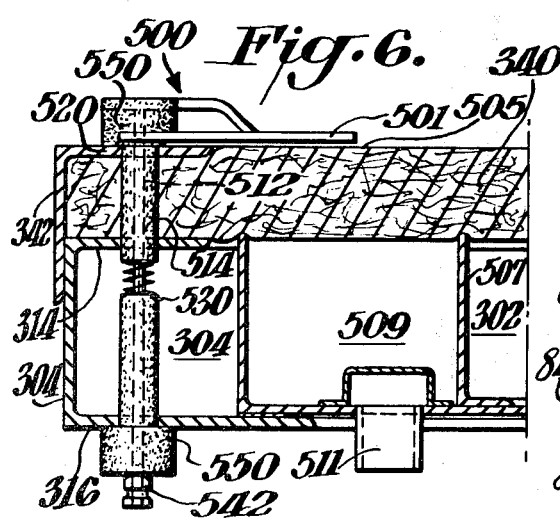
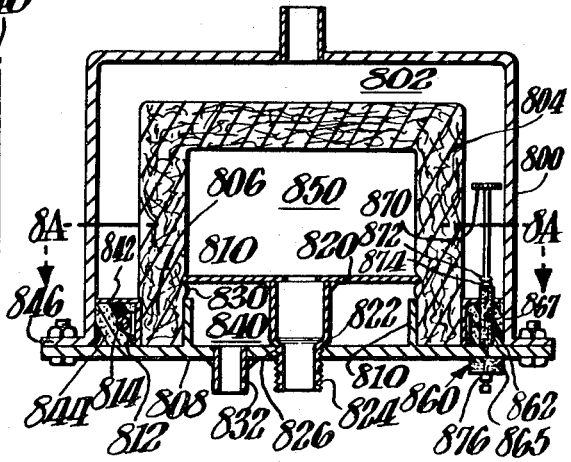
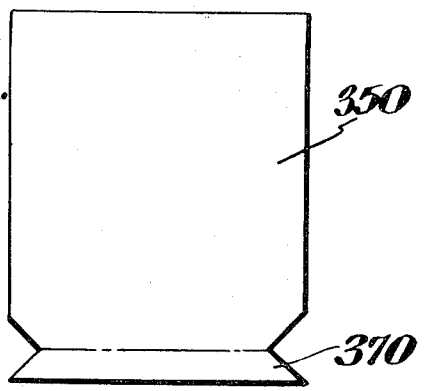

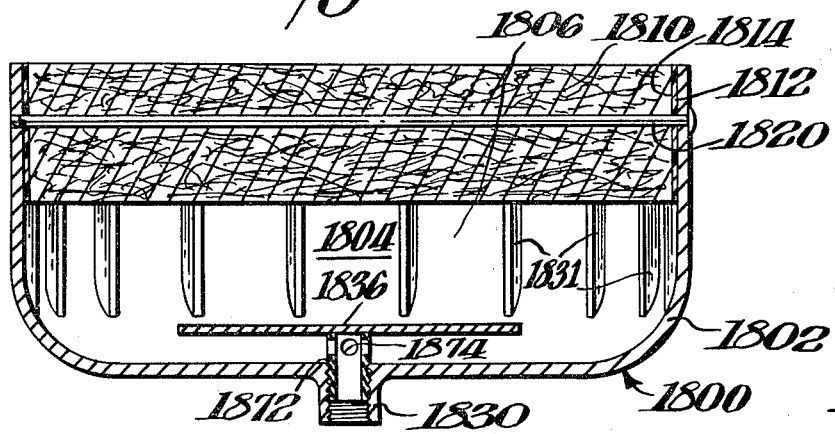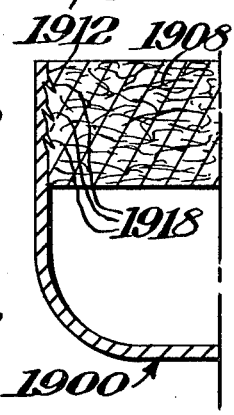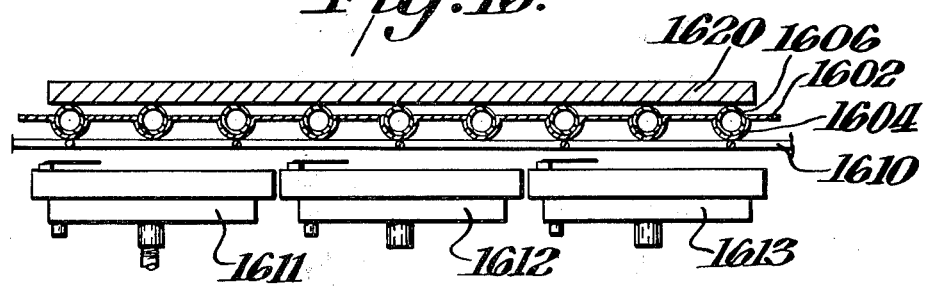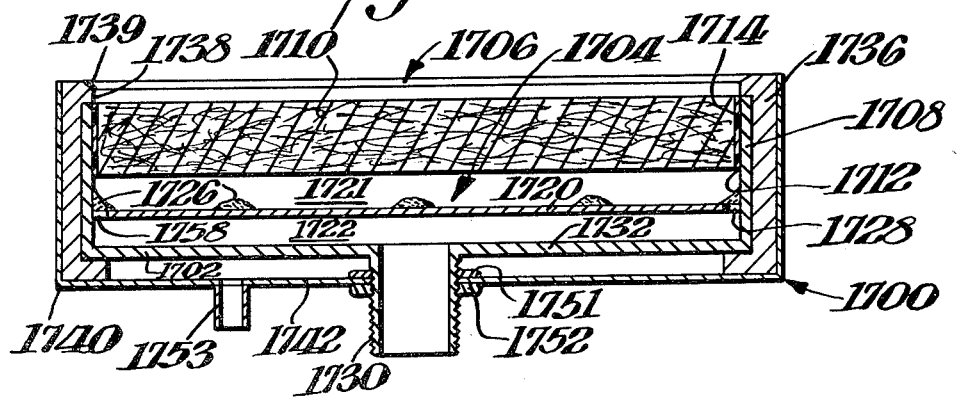

GAS-FIRED INFRA-RED GENERATORS AND USE THEREOF

This application is a continuation-in-part of applications Ser. No. 238,418 filed Feb. 26, 1981, Ser. No. 186,491 filed Sept. 12, 1980 (now U.S. Pat. No. 4,378,207 granted Mar. 29, 1983) Ser. No. 178,121 filed Aug. 14, 1980 (now U.S. Pat. No. 4,373,904 granted Feb. 15, 1983), Ser. No. 20,079 filed Mar. 13, 1979 (now U.S. Pat. No. 4,290,746 granted Sept. 22, 1981) and Ser. No. 952,332 filed Oct. 18, 1978 (now U.S. Pat. No. 4,326,843 granted Apr. 27, 1982). Applications Ser. Nos. 20,079 and 952,332 are in turn continuations-in-part of application Ser. No. 906,229 filed May 15, 1978, now U.S. Pat. No. 4,157,155 granted June 5, 1979, while Ser. Nos. 186,491, 178,121, 952,332 and 20,079 are continuations-in-part of application Ser. No. 863,251 filed Dec. 22, 1977, now U.S. Pat. No. 4,224,018 granted Sept. 23, 1980, and all of the immediate parent applications are continuations-in-part of applications Ser. No. 94,901 filed Nov. 16, 1979 (now U.S. Pat. No. 4,272,238 granted June 9, 1981) and Ser. No. 775,838 filed Mar. 9, 1979 (now U.S. Pat. No. 4,272,237 granted June 9, 1981).

The present invention relates to gas-fired burners that generate infra-red energy.

Among the objects of the present invention is the provision of novel methods and apparatus for constructing and using such burners.

The foregoing as well as additional objects of the present invention will be more fully understood from the following description of several of its exemplifications, reference being made to the accompanying drawings wherein:

FIG. 1 is a sectional view of a gas-fired radiant heater according to one aspect of the present invention;

FIG. 2 is a plan view of an assembly of heaters of the type illustrated in FIG. 1;

FIG. 3 is a sectional view similar to FIG. 1 of a modified heater construction pursuant to another aspect of the present invention;

FIG. 4 is a plan view of the heater of FIG. 3;

FIG. 4A is a plan view of a component of the structure of FIGS. 3 and 4;

FIG. 5 is a broken-away plan view of a portion of a heater showing a detail feature suitable for use according to the present invention;

FIG. 6 is a sectional view of the construction of FIG. 5, taken along line 6—6;

FIG. 7 is a sectional view of a different heater construction pursuant to a further aspect of the present invention;

FIGS. 8 and 8A are sectional views of a heater construction typifying yet another aspect of the present invention;

FIG. 16 is a vertical sectional view of a still further modified burner arrangement of the present invention; and FIGS. 17, 18 and 19 are views similar to that of FIGS. 1, 3 and 10 of yet other modified forms of a burner construction.

Figure 8A:
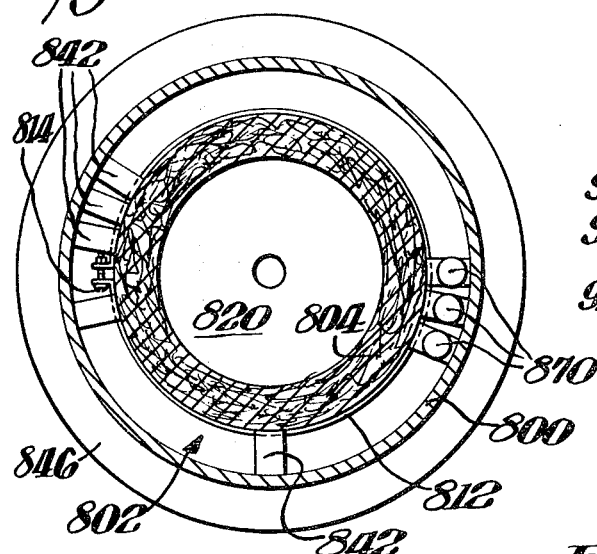

According to the present invention infra-red radiators of high efficiency are provided and they are used to efficiently supply thermal energy for heating operations.

FIG. 1 illustrates a heater 100 with improved edge sealing. Heater 100 has a cup-shaped panel 102 of interfelted refractory fibers as described in U.S. Pat. No. 4,035,132, clamped by its edges around a support assembly 104 made of stainless steel or other metal members shaped from relatively thin stock, about 1/16 inch thick. A central dish 106 has a floor 105 and inclined walls 107 with raised edges 108 against which the panel 102 is pressed to define a combustion mixture plenum 110. Outer face 103 of panel 102 is of rectangular shape, and so is plenum 110.

Secured to the outer margin of the floor 105 of dish 106 is a series of angles two of which are shown at 112, 114, defining a rectangular frame against which the edges 120 of panel 102 are fitted. These angles are illustrated as having horizontal webs 122 welded or brazed to the floor of dish 106, and vertical webs 124 that approach but do not quite reach the dish edges 108. The frame angles define with dish walls 107 an outer plenum 130 that encircles combustion mixture plenum 110 and has a discharge slot 132 that is engaged by the margin of panel 102. The frame members are mitered or otherwise interfitted at the corners of the frame to minimize, or completely seal the outer plenum against leakage in those locations. Supply nipples 146, 148 are fitted in openings in the floor 105 and one or more of the frame angles 112, to deliver, respectively, combustion mixture and non-combustible gas. Baffles such as the U-shaped deflector 116 can also be provided to help more uniformly distribute the incoming gases. Inasmuch as air is generally the non-combustible gas that flows through plenum 130, a little leakage from that plenum doesn't do any particular harm other than consume a little excess air.

A baffle is not needed where the panel 102 is sufficiently resistant to gas flow as to permit the pressure of the combustion mixture in plenum 110 to be maintained as at least as high as 3 inches of water column. With pressure of 4 inches or more burners can be operated very satisfactorily without baffles, even when a single plenum is 60 inches in length and 12 inches in width and is provided with only one mixture inlet.

Anchoring of panel 102 in place is shown as effected with the help of a series of four or more clamping angles 136, 138, clamping the panel edges 120 against the frame angles, with the help of screws 140 that penetrate through aligned openings in the angles and are threaded into self-locking nuts 142 mounted in webs 124 as by securing clips or welding. The screws which need be no thicker than about 3/16 inch, are readily pushed through the edges of the panel without seriously damaging the panel, and any damage that might promote gas leakage is more than compensated by drawing up the clamps sufficiently to compress the panel edges. Standard panels have a wall thickness of about 1 inch and an interfiber spacing such that more than half that thickness is fiber and binder, so that compressing the edges to reduce the overall thickness only about 10% sharply reduces the air space between fibers and greatly limits leakage.

However very effective panels of interfelted fibers can be made by needling a mat of such fibers without the help of binder. Such needled panels can be extremely pliable, as compared to molded binder-containing mats that are stiff like boards, and can have their edges compressed down to as little as about 30% of their uncompressed thickness. Even compressing such edges that are originally about one inch thick down to about $\frac{3}{8}$ inch provides an extremely effective back-up for the air seal.

For such panels it is preferred that the edge compression be down to about half the original thickness, or less. If desired however, a pliable panel can be stiffened over its edges alone, or over it entirety, as by impregnating it with a water solution of starch or the like. In such stiffened condition, the degree of edge compression can be reduced.

To reduce any effect that the compression may have in breaking panel fibers that are binder-impregnated, the panel edges to be compressed are first dipped in water or other solvent for the binder carried by the fibers. Such wetting makes the edges more readily deformable so that the compressing is easily effected without seriously stressing the clamping structures. To assure uniformity of compression of board-like panels, the screws 140 are no more than about 8 inches apart when the angles have the above-noted wall thickness. Where the heaters are operated in confined spaces so that the clamping angles are subjected to considerable reflected heat, it is helpful to cut slots about six inches apart through the vertical webs of those angles, to allow for thermal expansion and contraction without distortion of the support. Such slots need only be about 20 mils wide, but can be omitted where the clamping angles do not engage each other at the corners of the frame so that expansion is possible at those corners.

A feature of the heater construction of FIG. 1 is that a plurality of such heaters can be juxtaposed to make an effectively continuous radiant heating assembly that covers an extended area. Thus individual heaters are conveniently made with rectangular heater faces about one foot by two feet in size, larger sizes of stiff board-like panels being somewhat awkward to manufacture because the molding and handling is more difficult. However by making the smaller sized panels so that their edges 120 are bent down at least about 90 degrees from the plane of the panel body, considering such edge as a flange bent down from a flat sheet, and locating the edge mountings so they are at least partially inboard of the outer face of that flange and not projecting beyond that face more than about 5 millimeters, they juxtapose in a very desirable manner as illustrated in FIG. 2.

In FIG. 2 an assembly 200 of individual heaters 100 is made with the adjacent faces of their panel edges 120 about 3 millimeters apart as indicated at 202. The margins of the panel faces 102 can be made so that they have an essentially zero radius of curvature where they bend into the edges 120, but it is sometimes simpler to make them with a radius of about $\frac{1}{8}$ inch, and the foregoing 3 millimeter spacing of such rounded corners does not significantly detract from an effectively continuous heater surface junction, particularly where the combustion mixture is arranged to burn over the entire rounded corner. Increasing the spacing from about 3 millimeters to about 5 millimeters does make a significant discontinuity in the radiation uniformity but this can generally be tolerated. Spacings up to about $\frac{1}{4}$ inch or even up to about $\frac{1}{2}$ inch can also be used.

While the clamping screws 140 are shown as having round heads and thus project out the furthest from the outer faces of the refractory panel edges, such projection is not a problem so long as it is not over the 5 millimeter limit noted above, or the preferred 3 millimeter limit. These screws can be in unsymmetrical locations along each edge, so that the screws on one heater are offset from the screws of an adjacently positioned heater, as also illustrated in FIG. 2. Indeed the round-head screws can be replaced by socket-head screws which project a trifle more but are easier to install during manufacture. Flat-head screws can alternatively be used with the screw openings in the clamping angles countersunk so that the screw heads do not project beyond those angles, if minimum or zero spacing 202 is desired.

Nuts 142 can be omitted and the openings in the vertical walls of support assembly 104 can be threaded, in which event it is desirable to have the threaded aperture slightly undersize so as to make a very tight engagement with the threads of the screws 140.

The burner construction of FIG. 1 can also have panels of the pliable needled type described above. Such a pliable panel behaves very much like a blanket, and can have its edges folded and tucked in place between the side anchorage members. Because of their high pliability, the corners of such panels will squeeze into shape, although it may be helpful to cut away all excess corner material, and to even notch out some of the panel corners to make it easier to clamp these panels into place. It is preferred to confine any notching to portions of the corners covered by the anchorage members so as to reduce the leakage of gas at the notches.

It is not necessary to have the entire margin of each refractory panel 102 flanged over as at 120. Thus each of the panels in FIG. 2 has at least one margin that is not juxtaposed to another panel, and some have two such non-juxtaposed margins. Where only two panels are to be juxtaposed, each can have only one margin provided with a flanged-over edge 120, in which event the remaining three margins can have simple construction as shown in the flat panel exemplifications in the parent applications as well as in FIGS. 3 and 4.

Very close juxtaposition can also be provided by molding or shaping juxtaposed edges 120 so that they are bent down more than 90 degrees from the horizontal as measured by the angle 150 in FIG. 1. A panel can thus be molded around a suitably shaped molding screen with as many as three of its four sides having flanged edges bent as much as 100 or 110 degrees measured at angle 150, and the thus molded panel can then be slipped sideways off the mold in the direction away from its fourth side. Where only one flanged edge margin is desired, it can be made when molding the panel, or by bending down the edge of a flat-molded panel, after that edge is softened by wetting.

The construction of FIGS. 3 and 4 is one for flat heater panels and easily manufactured from readily available sheet metal. It has a panel support which is a welded-together assembly of a rectangular plenum box 302 and a hollow-centered rectangular encircling plenum tube 304. Plenum box 302 is conveniently prepared by suitably notching out the corners of a rectangular sheet, then bending up the four wings thus formed, and welding the resulting corners gas tight. A hole can then be punched in the floor of the box to receive a PTM half close nipple 306 also welded on gas tight. A baffle 308 can be spot-welded over the hole to distribute the combustion mixture fed through it, although baffling is not needed under the conditions explained above. If desired an extra tap 310 can also be provided at a second hole in the box floor, for a pressure gauge or the like.

Tubular plenum 304 is easily made from sheet metal bent into the shape of a channel having a web 312, and unequal flanges 314, 316. The channel is cut into four lengths each of which is mitered and then welded together, gas tight if desired. The tubular plenum can then be affixed to the plenum box as by spot welding the flanges 316 to the floor of the box. A gas inlet 320 in the form of half a close nipple can be affixed to the tubular plenum, along with an extra tap 322 in the same manner as for the box plenum, and a baffle 324 can be fixed over inlet 320 by spot welding to either the outside of the box plenum or the inside of the tubular plenum.

A slot 330, preferably ¼ inch wide, encircles the top of the box plenum. The refractory matrix 340 is clamped in place by a clamping frame 342 of angular section as illustrated in FIG. 3 and having slits 344 cut in the web overlying the face of the panel as shown in FIG. 4. The slits can be about 8 inches apart and preferably 1/16 inch wide to take care of the most severe thermal conditions. The clamping frame is secured by screws 346 as in the construction of FIG. 1, although sheet metal screws can be used instead in either construction, in which event the nuts can be omitted and if desired locking washers fitted under the screw heads.

In severe thermal conditions, such as firing face down or when firing directly at opposing burners, it is desirable to insulate the clamping frame 342 from the radiated and convected heat by over-wrapping with a high temperature insulating material such as mineral fibers felted or needled in blanket form. FIG. 3 shows a fiber blanket 350, approximately ½-inch thick, clamped and compressed between clamping frame 342 and refractory matrix 340, wrapped around the clamping frame 342 and web 312 and secured to flange 316 by means of clamp 360 and sheet metal or other screws 362. The fiber blanket 350 insulates the clamping frame from convected heat and its pure white color reflects some radiated energy from opposing burners making the system more efficient. In very high ambient operating conditions it may be desirable to completely wrap the non-radiant surfaces of the burner of FIG. 3 with the fiber blanket.

FIG. 4A shows the fiber blanket 350 as prepared for installation, having a tuck-in margin 370 which is inserted under the face of clamping frame 342.

In less severe applications it may be desirable just to cover the face of 342 and hold the blanket in place with the screws 346 and washers under their heads. In milder environments no external blanketing at all is needed.

The radiant heaters of the present invention can be equipped with automatic igniters such as electric spark igniters or pilot lights. FIGS. 5 and 6 show an automatic igniter construction fitted into a heater of the type illustrated in FIGS. 3 and 4. A standard combination 500 of spark rod 502, ground rod 501 and flame-checking rod 503 is mounted so that the rods are generally parallel to and about 1/16 to ⅛ inch above the outer face 505 of the porous refractory panel 340. Below the opposite face of the panel underneath the rod assembly, the box plenum is provided with a partition 507 that isolates a chamber 509 from the remaining space in the box plenum, and the chamber is fitted with its own supply connector 511 to receive a separate combustion mixture.

The spark rod 502 and flame-checking rod 503 are each housed in two identical insulators 550 which go through aligned openings punched in the top flange 520 of the clamping frame 342 and in the flanges 316 and 314 of plenum 304 as shown in FIG. 6. Ground rod 501 is welded or brazed to flange 520. Rods 502 and 503 extend as shown at 512 through tubular portions 514 of the insulators, and project out through flange 316 where they are threaded to each accept a connector 542 which holds then in place and provides a ready connection for the necessary wiring.

The construction of FIGS. 5 and 6 is operated to start the burners using a safety check. A separate pilot combustion mixture is first started into chamber 509 and at the same time the spark rod is electrically energized to begin sparking. If the flame rod does not sense a flame within a short period of time, such as 10 to 30 seconds, the flow of combustion mixture can be automatically cut off and the starting sequence must then be manually recycled, preferably after the combustion mixture flow is checked as by purging chamber 509. When the starting sequence causes ignition of the separate combustion mixture, the flame-checking rod 503 senses the ignition and opens the valve that feeds the main combustion mixture into plenum 302 which is then ignited by the flame at chamber 509.

By using a small chamber 509 with a low BTU/hour input for the automatic ignition test, the danger of explosion at ignition is minimized. A chamber volume of about 100 cubic centimeters or less is very effective for this purpose.

The pilot combustion on the radiating surface of the panel contributes to the overall radiation.

The spacing of the rod assembly from the refractory panel is preferably kept very small so that the rods do not interfere with placing the radiating surface close to the material being irradiated, such as a moving textile web that is being dried. Because the effectiveness of the heater increases when brought close to the material treated, the spacing of the panel from that material is sometimes arranged to be as little as two inches or even less.

FIG. 7 illustrates a radiant heater 700 of the present invention particularly adapted for the sealing of metal tubes in a metal sheet in accordance with the technique described in some of the parent applications. Heater 700 has a dome-shaped holder 702 welded gas-tight to a support ring 704 that is shaped to fit and receive the brim 710 of a hat-shaped refractory ceramic panel 720. The crown portion 712 of the panel is thus held in spaced relation to the dome-shaped holder 702 to define a plenum 730 for the combustion mixture to be burned on the concave surface of the crown 712. An inlet 732 and pressure gauge tap 734 are shown as fitted to the holder 702.

The brim of panel 720 is shown as clamped against support ring 704 by a clamping ring 706 which is bolted to an extension 708 of support ring 704 and is offset from it to form a cylindrical wall 740 that defines an annular plenum 750 for the non-combustible gas. If desired the offset can be made integral with the clamping ring so that support ring extension 708 can be in the general plane of the main portion of the support ring. Alternatively wall 740 can be divided into upper and lower short cylinders separately integral with the separate rings. An inlet 760 and a pressure gauge tap 770 are also provided for the annular plenum.

Figure 9:
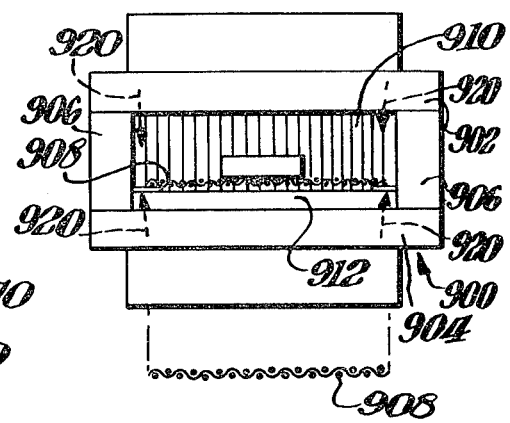
FIGS. 9, 10 and 11 are views of still further embodiments of the present invention.

The radiant heater 700 can directly replace the corresponding heater in FIG. 9 of U.S. Pat. No. 4,224,018 even though heater 700 has only one combustion zone. Non-combustible gas pumped into plenum 750 of heater 700 flows through the brim 710 of the porous refractory panel 720 and keeps the combustion mixture fed through plenum 730 from reaching the lowest portion of the internal surface of the panel where it is aligned with plenum 750. No external cooling coil or jacket is needed for the heater 700, inasmuch as the non-combustible gas emerging from the lower portion of the interior of the panel flows outwardly along the bottom of clamping ring 706 and keeps it as well as the associated metal parts sufficiently cool. Holder 702 as well as the remaining members that hold panel 720 can all be made of aluminum about 60 mils thick.

Another feature of the present invention is that the heaters with the air seal construction are particularly suited for use in house hot-air and/or hot-water heating furnaces. The air seal effectively prevents diffusion of the combustion mixture to edge locations where it can burn at a low feed rate and thus gradually burn back deeply into the binder holding the refractory fibers, eventually creating a line of weakness at which an unneedled panel tends to readily break. Indeed the burnback can sometimes burn back far enough to cause ignition within the mixture plenum itself, rendering the heater unsuited for continued operation. The edge seal construction of the present invention accordingly provides a very long life for the refractory panel, and is also so simple that it is inexpensively constructed and thus more attractive for relatively small home-type equipment.

FIGS. 8 and 8A show a hot air heat exchanger construction for house heating pursuant to the present invention. Here a cylindrical heat exchanger 800 has a hollow interior 802 in which is received a fibrous panel 804 also of generally cylindrical shape. The panel has an open end 806 clamped to a mounting plate 808 as by means of a rib 810 formed or welded on the plate and around which the panel end is squeezed by a split sheet metal strap 812 whose ends can be pulled together by a tightening screw 814.

Before the panel is fitted in place a partition disc 820, held on a tubular support 822 having an externally threaded extension 824 is mounted on mounting plate 808 which has a threaded aperture 826 that threadedly receives the threaded extension 824.

Partition disc 820 has its periphery located just above the edge of rib 810, to define a marginal slot 830 for discharge of a sealing gas stream through the marginal portion of the panel 804. An inlet nipple 832 provides for the delivery of the sealing gas stream to the sealing plenum 840 below partition disc 820. Extension 824 provides for the supply of combustion mixture to the plenum 850 above the partition disc.

Strap 812 is also shown as carrying a ring of outwardly-extending ears 842 that help retain a mass of insulation packing 844 fitted around the open end of panel 804 when mounting plate 808 is brought into engagement with the mouth 846 of heat exchanger 800. Some of those ears are also perforated to receive an ignition and test assembly 860 shown in the form of a series of ceramic tubes 862 each having an enlarged head 865 and threaded into aligned openings in the mounting plate. Through the passageway in each ceramic tube there penetrates a rod 867 having a disc-shaped inner end 870 and staked as at 872 so that it is appropriately located with respect to the ceramic tube. A washer 874 can be slipped over each rod before it is inserted in the ceramic tube, to furnish better positional coaction with the tube and the staking. The outer edge of each rod can be threadedly engaged to a mounting tip 876.

The discs 870 of each rod are arranged so that they are in edge-to-edge opposition suitable for sparking and for flame detection, as described in connection with FIGS. 5 and 6.

The outside of heat exchanger 800 can be located in the circulating air plenum of a standard house heater, or if desired in a water tank containing water to be heated. This heat exchanger can be made of metal or even of glass, borosilicate glass being particularly suited when the heat exchanger is used to heat water. Water to be heated in this way can be colored with dyes for example, to better absorb radiant energy transmitted through a transparent heat exchanger. Metal heat exchangers are desirably ribbed to increase their effective surface area and thus increase their heat transfer to surrounding air or the like.

The burner arrangement of FIG. 8 can be used in place of the FIG. 7 burner in a tube sealing apparatus, as by eliminating disc 820 and the remainder of the air-seal fittings, opening up the center of mounting plate 808 so that plenum 850 becomes a radiation transmitting space that delivers the radiation out the mouth of matrix 804, and if desired wrapping the exposed face of rib 810 with insulation as in FIG. 3. Combustion mixture is then fed into chamber 802.

Another feature of the present invention is the ability to use an inert or reducing gas to seal the combustion mixture on its way through the porous refractory panel. Thus the sealing gas can contribute to make the burnt combustion mixture provide an atmosphere of exceedingly low oxygen content, or even of strongly reducing ability as for example by reason of a significant hydrogen content.

FIG. 9 shows an annealing tunnel furnace 900 having upper and lower radiant heaters 902, 904 facing each other and held in fixed relation by side blocks 906 of thermal insulation. A wire mesh conveyor 908 is arranged to slide through the furnace interior to carry workpieces that are to be annealed or brazed. A strip curtain 910 closes off the entrance to the furnace, above the conveyor. The portion of the entrance below the conveyor is shown as closed by a one-piece wall 912.

The heaters 902, 904 are operated in the manner described above, except that the sealing gas streams, indicated by arrows 920, can be cracked ammonia, or a propane-nitrogen mixture, or pure propane or the like. With such sealing gases, it is preferable to adjust the combustion mixtures so that they have little or no surplus oxygen. The furnace interior then becomes a very effective reducing atmosphere that will prevent oxidation of the workpiece and even reduce any oxidation present on those pieces when they are introduced into the furnace. Notwithstanding the strongly reducing character of the furnace interior, the burning of the combustion mixture takes place very effectively to provide radiation at temperatures at least as high as red heat.

For high heat output from the furnace, the workpieces should be arranged to absorb larger proportions of the infra-red energy, as by packing them very close together in the conveyor 908, or by arranging for a workpiece to be a continuous length of material that spans the entire width of the burner faces.

Figure 10:
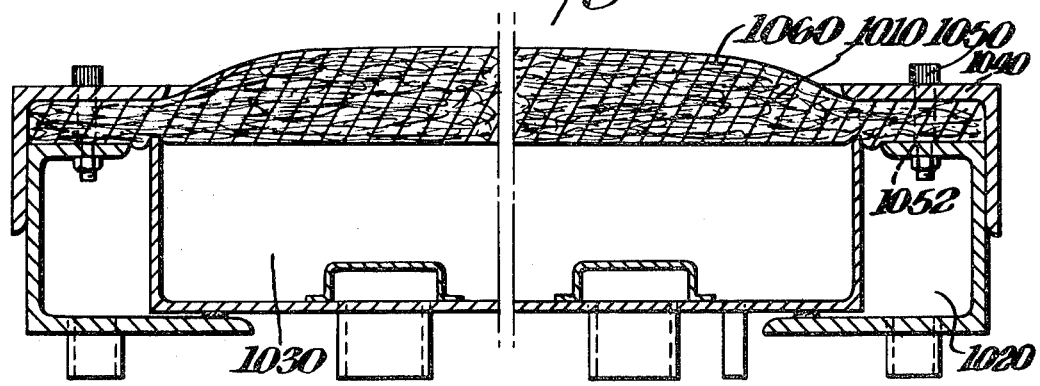

The needled ceramic fiber panels described above are conveniently manufactured in very long lengths, as long as 25 feet or even longer. Such panels are particularly suited for use with very long radiant heaters, and a construction of this type is shown in FIG. 10.

Here a ceramic fiber panel 1010 about fifteen feet long and about one foot wide, has its edges clamped against the face of an air seal plenum 1020 surrounding a rectangular combustion mixture plenum 1030. Angles 1040 compress and clamp the panel edges, being drawn against the air seal plenum face by screws 1050 that can be fitted with shoulders 1052 against which they can be tightened at relatively high torque with a minimum of attention.

A panel 1010 that is not stiffened with binder or the like, will belly out as shown at 1060, under the influence of the pressure in plenum 1030. This is not particulaly harmful, and is in some respects desirable because it reduces the heat radiation from the face of the panel to the clamping angles.

The bellying action can be reduced by pretensioning the panel when it is mounted.

Figure 11:
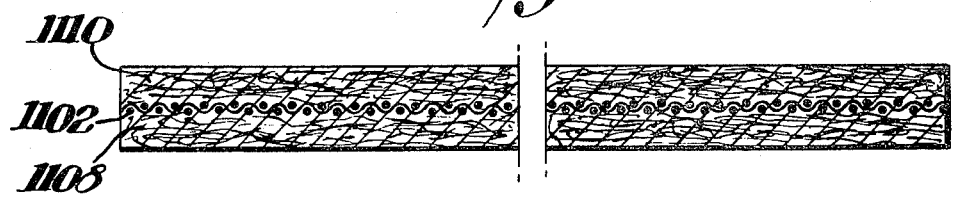

Another technique for stiffening a pliable panel is to needle it around a stiffener as shown in FIG. 11, for example. In this construction a wide mesh metal screen 1102 is laid in between two layers 1108, 1110 of ceramic fibers, and a needling operation then performed to interfelt the two fiber layers.

Figure 12:
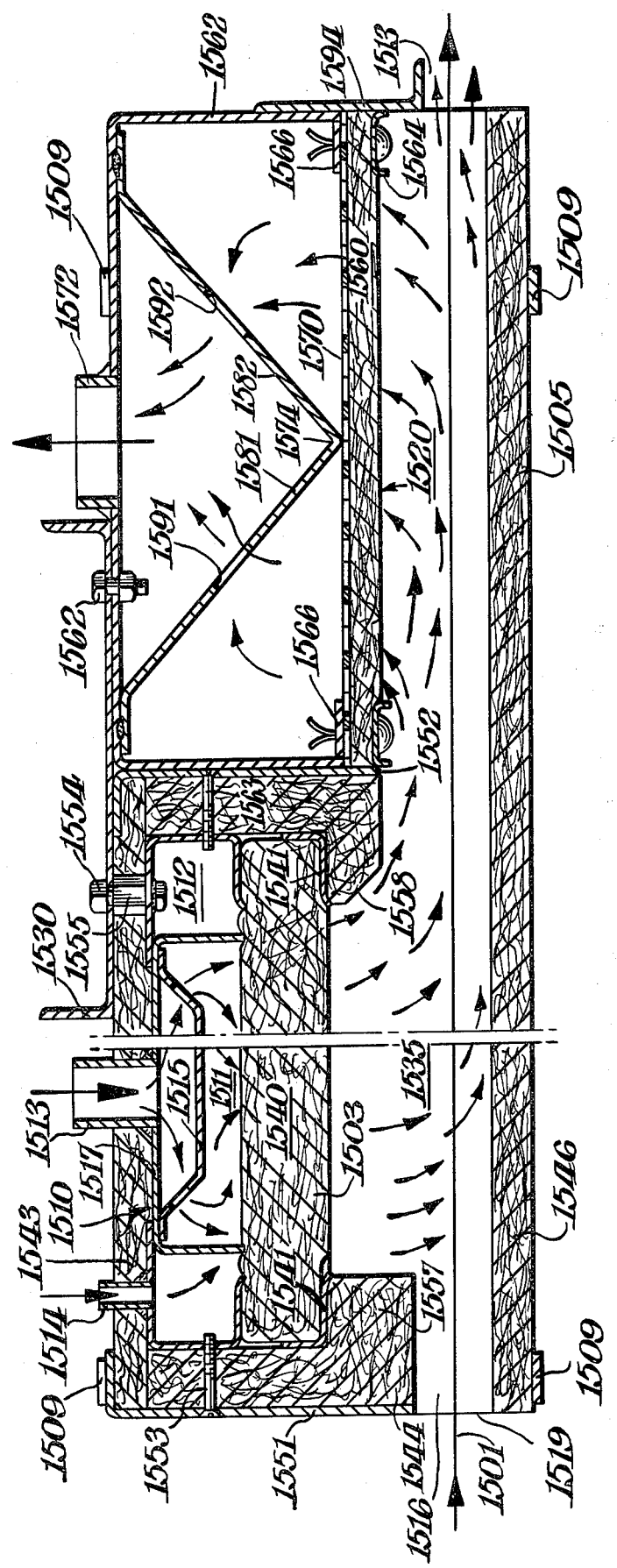
FIG. 12 is a vertical sectional view partly diagrammatic of a heating arrangement pursuant to the present invention.

FIG. 12 shows a particularly effective heating arrangement for heat treatment of a moving web such as in textile drying and curing or paper processing or curing coatings on webs or wires. The illustrated construction is a modification of the construction of FIG. 22 in parent application Ser. No. 186,491 with the parts similarly numbered, and can be constructed in a similar manner. The description in that application is hereby incorporated herein as though fully set forth.

A key modification in FIG. 12 is the use of the apparatus for curing coatings on wires. A horizontal row of freshly coated parallel wire strands 1501 is passed below the incandescent face 1503 of the burner 1510 as well as below the face 1520 of re-radiator panel 1560. Also a supplemental re-radiating panel 1505 is mounted below the wires 1501, by securing it between the skirts 1536 of depending side panels.

Panels 1560 and 1505, as well as skirt faces 1516 can be of the same ceramic fiber re-radiator construction forming an almost complete enclosure around the wires 1501. Such an arrangement provides highly efficient wire heating inasmuch as the radiant energy created at burner face 1503 reverberates throughout the enclosure with essentially the only escape at the relatively shallow apertures 1511, 1513 through which the wires enter and leave. Some of that energy is also absorbed by the wires and their coatings, so that making the apertures 1511, 1513 smaller increases the efficiency of the heat transfer to the wires and their coatings, and decreases the rate heat is required to be generated at burner face 1503.

Reducing the surface area of the walls bounding the reverberation compartment also decreases the loss of heat through those walls and likewise decreases the rate of required heat generation.

According to the present invention the reverberation compartment preferably has its walls not more than about 1 inch from the wires, and extends longitudinally of the wires a distance no more than about twice the longitudinal span of burner face 1503. With such an arrangement there is no need to make the apertures 1511, 1513 any smaller than the cross-section of the reverberation compartment, although for best efficiency those apertures can have half that cross-section, or less. Panel 1505 can be made readily removable if it is desired to simplify the threading of the wires through the reverberation compartment. To this end panel 1505 can be held in place by metal clips 1509 snapped over the top of the apparatus.

As described in Ser. No. 186,491, the hot combustion gases emitted from burner face 1503 are carried over through re-radiator panel 1560, which is porous, and drawn off at outlet 1572. This action helps heat up surface 1520 and thus increase its re-radiation effectiveness.

The construction of FIG. 12 can be operated upside down so that the burner face 1503 faces upwardly, and in such an arrangement the sucking of the hot combustion gases through panel 1560, or through any other panel is ordinarily not needed. Those hot gases can be merely permitted to flow out the ends of the reverberation compartment. However the sucking action does help increase the temperature of the face of the panel through which the sucking takes place. Moreover when the wires have coatings that give off noxious gases such as vaporized coating solvent, the sucking action can be used to collect those gases and in this way better control their disposal.

Additionally many gases so evolved are combustible and can be made to burn on the surface 1520 through which they are sucked, to thus further increase the heating and curing effectiveness of the apparatus of the present invention, and at the same time reduce its environmental impact. A coating of platinum black particles can be applied to surface 1520 as by spraying it with a solution of chlorplatinic acid and then heating the sprayed surface to a temperature that decomposes the chlorplatinic acid. Catalyst weights of as much as one to two grams per square foot of gross surface (as measured with a ruler) can be used. Other platinum family metals and oxidation catalysts can be substituted for the platinum. Cerium oxide and the oxides of other rare earth metals are examples of good oxidation catalysts.

The catalytic combustion feature can be used without the reverberating compartment, as for example when heat treating webs of coated carpeting or other gas-generating materials that are essentially opaque to the radiation with which they are treated.

It is noted that the catalytic combustion of vapors generally calls for the presence of significant quantities of oxygen in the vapor-carrying gases. Burner 1510 is of the air-seal type through which a curtain of air is discharged from plenum 1512, and the rate of such discharge can be controlled to assure the presence of sufficient air in the gas stream sucked through panel 1560. Some air can be introduced from the surrounding atmosphere, particularly when no reverberation compartment is used, so that the air-seal air may not be needed to supply all the oxygen for the catalytic combustion.

Whether or not air is needed for addition to the hot combustion gases, burner 1510 can be replaced by one that is not of the air-seal type. The hereinafter described construction of FIGS. 17, 18 and 19 are examples of this type, when the outermost cooling jacket of FIG. 17 is omitted. Additional air can be entrained in the gaseous mixture burned on the surface of 1540 in the form of excess air. As much as 50% excess air could be entrained without seriously affecting total efficiency.

The reverberating compartment feature of the present invention is particularly suited for irradiating substrates too open or transparent to effectively absorb an impinging irradiating beam having a substantial cross-sectional area. Woven screening or highly transparent plastic webs are further examples of such substrates.

Figure 13:
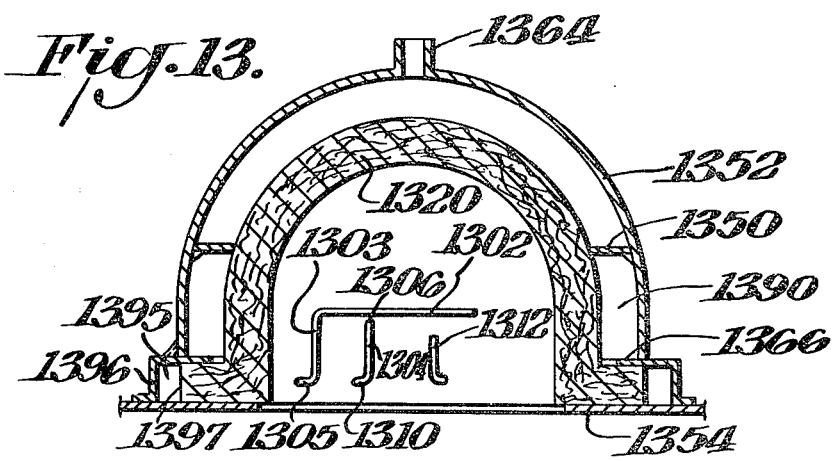
FIG. 13 is a vertical sectional view of a hat-shaped burner showing a modified ignition and control arrangement.

FIG. 13 illustrates a particularly desirable electric ignition arrangement. Here a ground electrode rod 1302 is arcuately shaped to fit snugly close to the inner surface of a hat-shaped matrix 1320, has one end 1303 offset and bent outwardly at 1305 to project laterally through the brim 1397, and is secured in the outer wall 1396 of the air-seal plenum 1395. An ignition electrode 1304 is shown as a rod positioned so that its end 1306 is located about ⅛ inch from an intermediate portion of the ground electrode. Electrode 1304 is shown as held in place by an outwardly bent extension 1310 that also passes laterally through the matrix brim and is secured, by means of an insulator, at the outer wall 1396. The spark gap between electrodes 1302, 1304 is located adjacent a portion of the matrix through which combustion mixture emerges, so that the generation of sparks in the gap ignites the mixture. A ¼ inch spacing of the gap from the matrix surface is suitable but no spacing is needed.

The electrodes can be rods only about ⅛ inch in diameter so that they do not significantly intefere with the energy radiation from the matrix. These electrodes can also be made of stainless steel, or Inconel, or other high-temperature-resistant metal, to better withstand the temperatures to which they are subjected when the matrix is generating its maximum energy.

Where it is desired to have the additional safety of an automatic gas shut-down in the event the combustion mixture emerges without burning, a sensing rod 1312 similar to electrode 1304 can also be mounted adjacent the inner surface of the matrix so that this rod reaches a location at which combustion takes place. An electric potential applied between sensing rod 1312 and ground rod 1302 will cause current to flow through ions generated by the combustion, and such current will not flow when the combustion terminates or fails to start. Such current change can then operate a relay that shuts down the gas supply to the combustion mixture, or shuts down the flow of the entire combustion mixture.

The electric ignition can be used to directly ignite the combustion mixture of zone 1390 of the burner, or if desired it can ignite the combustion mixture of a small pilot area of the matrix. The latter arrangement is more suited for burners having large plenums, as for example elongated burners with flat matrixes.

Figure 14:
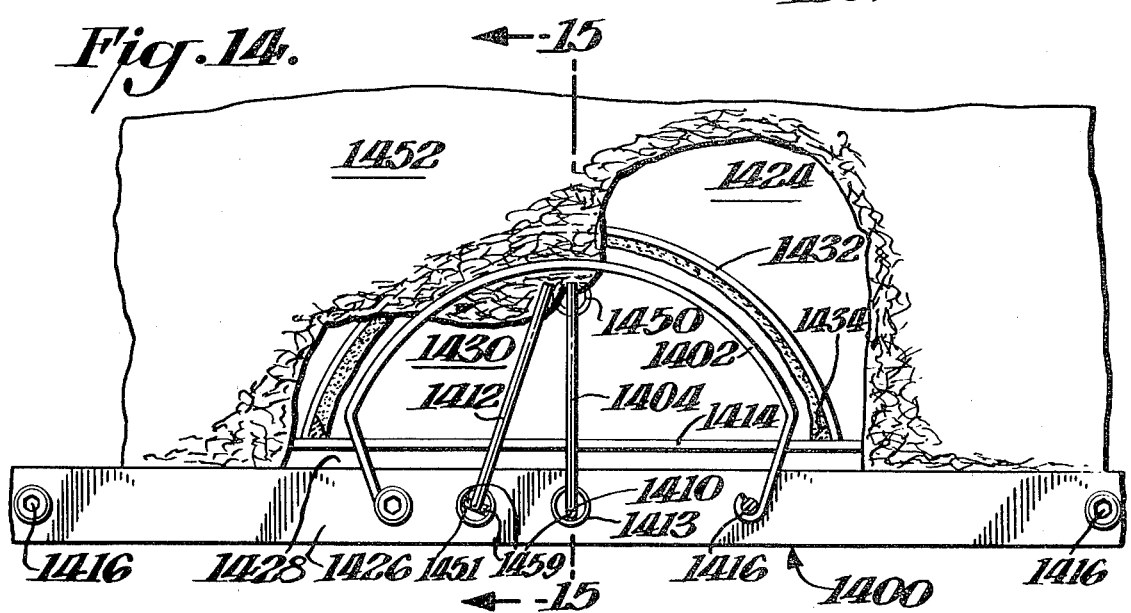
FIG. 14 is a detail plan view partly broken away, of an ignition and control arrangement incorporated in a burner with a flat matrix.
Figure 15:
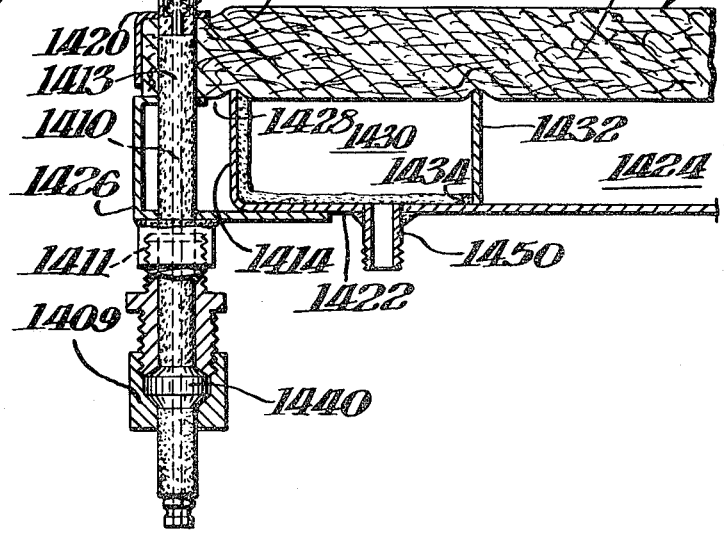
FIG. 15 is a sectional view of the arrangement of FIG. 14, taken along line 15—15.

FIGS. 14 and 15 illustrate the last-mentioned construction. In these figures a burner 1400 such as is shown in Ser. No. 775,838 has a flat matrix 1452 clamped by a hold-down frame 1420 against the open face of a burner body 1422 assembled from a combustion mixture plenum box 1424 and an encircling air plenum channel 1426. A slot 1428 is provided between channel 1426 and box 1424 to permit a stream of air to flow through the matrix periphery.

Ground rod 1402 is here shown as generally semi-circular having its ends secured under the heads of bolts 1416 that clamp the matrix in place. Such bolts are generally provided as an equally spaced series so that the ground electrode can be dimensioned to be received between any adjacent pair of these bolts.

Ignition electrode 1404 is shown as held in place by an outwardly bent end 1410 received in tubular ceramic insulator 1413 fitted through suitable openings in the burner body as well as through the matrix edge. A similar mounting can hold sensing rod 1412 within the confines of the ground electrode 1402, and can hold all three rods of FIG. 13. An internally threaded metal fitting 1411 can be welded around an opening in the back of the burner body, to threadedly hold a clamping head 1409 that grips the ceramic tube. A plumbing type compression fitting including a soft brass compression ring 1440 is particularly suitable for use with simple ceramic tubes.

The space occupied by the ground electrode in FIGS. 13 and 14 can also be made into a pilot burner compartment 1430 by a partition 1432 which can be tack-welded to the floor of the combustion mixture plenum 1424 as well as to its wall 1414. A sealant such as a self-curing silicone paste 1434 can be applied to the joint between partition 1432 and the mixture plenum to seal off the sides of compartment 1430, and a special nipple 1450 connected through the mixture plenum floor for feeding combustion mixture into the compartment.

The ignition arrangement of FIGS. 5, 13 and 14 are particularly desirable for use with burners that have an air-seal margin. The rod mountings are fitted through that margin and do not have to be sealed where they fit through inasmuch as combustion mixture does not reach the margin. So long as the leakage at these fittings does not excessively load the air supply for the air seal, there is no problem.

For more dependable operation of the construction of FIGS. 5 and 14, provisions may be made for preventing rapid lateral air movement across the face of the matrix inasmuch as this may cause the sensing electrode e.g. 1412 to become insulated from burning combustion mixture by a layer of such air and thus fail to operate properly. An upstanding baffle secured to the burner adjacent the sensing electrode is generally all that is needed.

The construction of FIG. 14 can be made so that it can be assembled without adjustment of any of the rods. Thus the ceramic tubes 1413 can have their internal passages provided with grooves 1451 that extend longitudinally along a passage, and the rods can be deformed as by pinching their sides to make projecting ears 1459 that snugly fit in the grooves. It is then only necessary to rotate the ceramic tube into suitable orientation and lock it in place in the clamp 1409 to complete the mounting and positioning of a rod. The locked tube will not rotate, and the ears 1459 will keep the rod from rotating within the tube.

The orientation of the locked ceramic tube for igniting electrode 1404 is not critical inasmuch as ground rod 1402 is semicircular and the rod end 1410 is mounted at the center of that semicircle. If desired the rod 1404 can be inclined as much as 20 degrees either side of the position illustrated, without changing the effectiveness of the spark gap. Sensing rod 1412 likewise needs no critical orientation. As shown the sensing rod can be a duplicate of the igniting electrode, and care is then needed to keep the sensing rod spaced from the other electrodes.

Ceramic tubes 1413 need not be of one-piece construction, but can be an assembly of short lengths. In this modification the rod mounts such as 1410 can have its positioning ears 1459 or can have additional positioning ears fitted in grooves in the ceramic tube length that is locked by the clamp 1409.

The ground rod need have only about 60 degrees of circular arc to provide more than enough mounting tolerance for the sparking electrode. The remainder of the ground rod can if desired extend from each end of the arc directly to the ground rod end mounts, or can complete a true semicircle, or take any other shape.

The proving electrode 1412 should extend at least about one inch inboard of the air seal, and the ground rod should have a length inboard of that seal about four times the length the proving electrode extends inboard of that seal. It is also helpful to make the ignition electrode tip pointed.

The construction of FIG. 13 can also be modifed by omitting the matrix brim 1397. For this modification the convex matrix 1320 is held against plate 1354 by the partition 1350, and if desired with the additional help of an extension of mixture inlet 1364 arranged to engage the top of the matrix. An air-seal partition 1366 can then be pressed against the sides of the matrix, or the matrix can be shaped to flare out at its mouth and be sealed against an air-seal partition the same way it is sealed against the interzonal partition 1350.

Whenever a matrix is squeezed between opposing hard members as at its edges in FIG. 15, or at brim in FIG. 13, it is helpful to make sure the squeezing members do not have a sharp projection or corner that might tend to cut into the matrix fibers. Thus in the construction of FIG. 15 it is desirable to round off the lower corners 1481 of the horizontal angle frame flange where they engage the matrix. The opposing squeezing edges of wall 1414 and of the upper flange of the air-seal plenum in that construction as well as the corresponding brim-squeezing edges of FIG. 13 can also be rounded, as can the counterpart edges in the other constructions.

The heaters of the present invention can be used for soldering with silver solder and even with soft solder, instead of for brazing as shown above. For soft soldering the heat requirement is relatively low and a flat-faced burner is more than adequate. Articles having extensive width, such as solar panels, can be very readily soft soldered by heating them with a row of burners, and in such arrangement the burners are preferably placed under the panel so that they are operated with their matrix facing upwardly. In this arrangement the naturally upward flow of combustion gases makes it unnecessary to have the special flow directing structure used for brazing.

FIG. 16 shows such an arrangement in which a solar panel 1602 is provided with cylindrical depressions 1604 in each of which a length of tubing 1606 is to be soldered. The panel can be many feet in length as well as width, and the tubing even longer so that the tubing ends project beyond the panel and can be connected to fluid supply and withdrawal structure. The panel is held on a grid 1610 of narrow spaced metal strips, and three burners 1611, 1612 and 1613, or three rows of burners, each as long as the panel, are located below it. Because of technical difficulties in manufacturing as well as mounting a single burner matrix as long and wide as panel 1602, each burner is arranged to heat only a limited portion of the panel. A hold-down 1620 is arranged to press down against the tops of tubes 1606 and hold them in place in the depressions.

The depressions carry a quantity of soldering flux and powdered solder, and after a solar panel is mounted in position the burners can be fired and the hold-down pressed down. It takes less than a minute to thus complete the soldering of copper tubes having a 20 mil wall thickness to a copper sheet having a 10 mil thickness.

It is not necessary that the burners be fired at the same instant, so that standard electronic ignition timing arrangements are appropriate notwithstanding the fact that such arrangements can inject a time lapse of as much as 5 to 10 seconds between the light-off of the first and last burners. Instead the outer burners can desirably be lit before the inner one, inasmuch as the heat losses are greater from the sides of the solar panel than from its center.

In the arrangement of FIG. 16, the depressions 1604 are shaped to extend somewhat more than halfway around the tubes, so that the mouth of a depression is slightly narrower than the maximum width of a tube. The tube will then snap in place in the depression and thus more positively be held in the desired position. However it is not essential to lock the tubes in place. Indeed the tubes can be made with a D-shaped cross-section and the flat portion of their exterior can be soldered against a panel that has no depressions and can be perfectly flat.

To reduce the time required for heating the combination to effect sealing, hot gases such as combusted fuel gas, can be passed through the tubes, with the help of a manifold or header into which the tubes are fitted. The combination is preferably arranged to take place close to the manifold, and the combusted gases diluted with excess air to control the temperature and avoid overheating. At the end of the heating cycle, it is preferred to speed the cooling as by not only terminating all combustion, but continuing the flow of air alone through the burners as well as the tubing. It is also advisable to pre-solder the surface of the tubes where they are going to be soldered to the sheet, and to apply only a thin layer of flux to the sheet at the soldering locations. Alternatively the sheet surface can be presoldered.

Lengths of pipe can also be heated by flat-matrix burners, deployed in rows around the entire outer surface of pipes as long as 20 feet, for example. To speed such heating the hot combustion gases can be collected from around the burners and blown through the interior of the pipe, as by surrounding the burner assembly, or the spaces between adjacent burners, with conduit walls that direct the emitted gases to one end of the pipe so that they can be introduced to the pipe interior. The volume of space within large-diameter pipes can be reduced by inserting a mandrel into the pipe interior, so that the hot gases passed through it are confined adjacent the internal surface of the pipe. Swirling baffles can also be mounted around the mandrel to help make the gases moving within the pipe more uniform in temperature. It may be desirable to apply thermal insulation over the outer surface of the mandrel to reduce heat losses. The combustion gases exiting from the interior of the pipe being heated still have sufficient heat for pre-heating the next pipe to be heated, and for this purpose a pipe to be preheated can be coupled to a pipe being heated.

Burner assemblies such as those of FIG. 16 can also be arranged to fire face down or to fire facing any other direction. Thus they can be connected together to make a radiant roof for heating glass lehrs for example. One convenient arrangement of this type has a row of elongated burners each connected by its ends to the opposite arms of an overhead rectangular frame. The burners can be spaced a little from each other to permit burnt combustion gases to escape between them, or they can be packed together, preferably with thermal insulation strips squeezed between adjacent burners, to keep those gases from escaping upwardly.

The supporting arms of the frame can be made of metal tubing and can thus also be used to pipe to the burners their gas requirements. Thus the piping frame can carry an air stream which is fed to the air-seal chamber of each air-seal burner in the group, and which is also fed to a gas-air mixer that is separately supplied with gas that it mixes with the air to make a combustion mixture fed to the combustion mixture plenums of the burners. Alternatively the burners can have connections at their opposite ends for receiving the respective supplies, with these ends coupled directly to and opening into the opposed arms of the piping frame, one of these arms carrying air alone, and the other carrying the combustion mixture. Flow-control valves can be provided in the combustion mixture connections to the individual burners for adjusting the burning pattern for the row of burners.

The radiant roof assembly can have its burners with or without air seals and needs no covering over the tops of the downwardly facing burners. Without such covering the burner backs can be directly exposed to the external atmosphere so that those bare backs are thus subjected to very effective cooling by that atmosphere. If the maximum temperatures are desired for workpieces subjected to heating by the roof, it is preferable to use burners without air seals and packed together to minimize upward escape of the combustion gases.

Where combustion mixture is passed through a pipe exposed to heating as by the hot combustion gases, or by reflected infra-red radiation, such a pipe is best shielded by insulation to thus minimize danger of undesired ignition in such pipe. Ignition on the matrix surfaces is conveniently supplied by electric igniters, such as those described above which do not take up any space between burners, or such igniters can be mounted at one end or the other of each burner in the pack, and thus permit the long sides of adjacent burners to be brought into engagement with each other.

FIG. 17 shows a burner 1700 that operates well without an air-seal. This burner has a body 1702 of relatively thick metal and shaped, as by welding together rectangular plates, to provide the combustion mixture plenum 1704. The mouth 1706 of the plenum body receives a ceramic fiber matrix 1710 which is shown with its edges adhered to the inside surface 1712 of the mouth by a cement 1714 that withstands tmperatures at least as high as 400° F., preferably at least as high as 450° F. or 500° F.

A silicone cement is very effective for this purpose.

The mixture plenum is relatively shallow, only about an inch deep, and it is separated into upper and lower chambers by a partition 1720 extending across it. The partition is slightly smaller in length and width, than the plenum, and is tack-welded at spaced locations 1726 to the plenum walls so as to leave a narrow passageway 1728 around its periphery. A threaded connector 1730 is welded into an opening in the back wall 1732 of the burner to receive the combustion mixture, and another connector can be similarly provided for pressure measurement, if desired.

Burner 1700 is illustrated as also having its side walls 1708 surrounded by insulation. Preformed blocks 1736 of insulation that can be made of the same material as the matrix 1710, are shaped to fit against those side walls as well as over the top and under the bottom of each wall. Each block can run the full length of the wall it fits against, and the blocks can be mitered together at the burner corners. The blocks can be cemented in place, or strapped around the burner with baling straps or the like, or they can be held by an enveloping frame 1740. Such a frame need only be a very thin gauge metal sheet notched out at the corners and folded into the box shape shown. The frame can be cemented to the insulation blocks, or a baling strap can be clamped about the frame, or the frame can have its corners welded or crimped together to make a self-supporting structure that holds the insulation blocks in place and protects them against physical damage.

The frame can be secured as shown in FIG. 17 by providing its floor 1742 when an opening that fits snugly around connector 1730 and clamping it to that connector, between two nuts 1751, 1752 threaded to the exterior of the connector. An additional connector 1753 can also be fitted in the frame floor to deliver a cooling gas to the interior of the frame so as to cause the gas to pass through the insulation blocks and escape at the mouth of the frame to thus reduce the absorption of heat by the burner walls 1708 from the hot combustion gases.

As also shown in FIG. 17, the insulation blocks can have a nose 1738 that covers most or all of the upper edge of a burner wall 1708, to further impede the flow of heat to that wall.

The outermost projection of the insulation blocks 1736 can also be beveled as shown at 1739. This reduces the likelihood of physical damage at that location and also makes the projecting insulation face better reflect away incoming infra-red radiation that would otherwise reach the matrix face and tend to overheat it.

The elaborate protection features of FIG. 17 can be dispensed with. Thus a burner having a body made of aluminum about $\frac{1}{8}$ inch thick operates very effectively without the help of any external insulation or air flow, and even if the burner is not equipped with the plenum partition 1720. Although the matrix 1710 is installed in such a burner as a slip fit so that it is only held in place by silicone cement or resin applied as a very thin film to the matrix edges and to the burner wall which it engages, the matrix remains securely held in place by the silicone through many hours of face-up operation with the outer matrix surface at 1600° F.

Removal of the matrix after such operation shows the silicone to be essentially undamaged, even at the lip where the silicone is in contact with incandescent matrix fibers. It appears that a metal wall $\frac{1}{8}$ inch thick having the thermal conductivity of aluminum withdraws heat from the silicone layer so rapidly that it keeps the layer from heating up to the temperature at which it begins to be damaged.

Silicone layers about 40 mils thick may begin to be damaged where they are in contact with incandescent fibers, but if there is such damage it is confined to the portion of the layer most remote from the heat-withdrawing side wall and does not significantly impair the operation of the burner or shorten its useful life. Compounding the silicone with particles of finely divided metal such as aluminum or copper makes the silicone more readily conductive to heat and keeps it from being significantly damaged when in a layer as much as 60 mils thick.

Copper has a thermal conductivity substantially higher than that of aluminum and can be used in place of aluminum for the burner body. A copper body will provide the operation described above even when its wall thickness is only about 70 mils. Steel on the other hand has a thermal conductivity poorer than aluminum, and a steel wall thickness of about ¼ inch provides about the same results as a ⅛ inch thick aluminum wall.

In order to better allow for the simple sliding of a matrix in place in the burner of FIG. 17, the walls 1708 of the burner body are preferably joined together at the corners so as to present an essentially zero inside corner radius. Thus the body can be made from a square or rectangular metal sheet whose corners are notched out to leave four flaps projecting from a center panel. These flaps are then readily folded up to make the walls, and then joined together at their corners. They can for example be welded together with the welding effected at the external portions of the corners without deforming the inside aspect of the corners and without depositing weld metal on those insides.

Alternatively the walls can be joined at their corners by brazing, and even by cementing as with a silicone resin. Although such resins are frequently of rubbery or yieldable nature, the burner body metal is so thick that it provides adequate rigidity to burners whose wall corners are cemented together even when the burner faces are as large as one foot by two feet.

When the plenum partition 1720 is used and welded to the walls, it serves to greatly increase the rigidity of the burner body and make edge cementing practical for still larger sized burners.

A burner with the foregoing corner construction readily receives a matrix that is merely cut with its edges perpendicular and true, and no effort is needed to round off the matrix corners. Such a cut matrix is merely thinly buttered over its edges with the cement, a thin bead of cement is applied along the inside faces of the upper portions of the walls, the matrix is laid flat on a table top, and the burner body turned face down and lowered over the matrix until the burner lips also rest on the table top. The assembly is then permitted to stand an hour or so to allow the cement to cure, after which the burner is ready for use.

The burner without the external insulation and without the plenum partition can also be operated face down or with the plane of its matrix vertical, but the burner body is then subjected to heating by the rising hot combustion gases and becomes hotter than it does when operated face up. For such more rigorous operation, it is preferred that the matrix temperature be not over about 1450° F., or that the operation be discontinuous so that the temperature of no part of the burner walls reaches 500° F.

The application of external insulation to the exterior of the uppermost burner wall when the burner is operated tilted, or to the exterior surfaces of all walls when the burner is operated face down, keeps the burner body cooler. Such insulation need only be about ¼ inch thick but should be thicker when it is to be in the form of a fitted block as shown in FIG. 17. It is perfectly adequate in most cases however to merely wrap a strip of insulation blanket around all four outer walls of the burner, and strap the wrapped strip in place.

The use of the plenum partition 1720 also helps cool the side walls inasmuch as the partition causes all of the cold combustion mixture to sweep past the inside surfaces of those walls and thus cool them by an appreciable amount. A burner so constructed operates continuously face down without external insulation but with the maximum matrix temperature about 1500° F.

The cooling effect of the partition is increased by welding a greater proportion of its edge to the walls so that the partition helps conduct heat away from the walls. Also diminishing the depth of the plenum 1704 between the matrix and the burner back 1732 shortens the path by which heat is conducted from lips of the side walls back to the burner back and to the combustion mixture supply pipe, and this also helps cool the walls better. Thus the plenum depth can be made as small as ⅜ inch, the corners of the plenum can be beveled, and/or the matrix itself can be made relatively thin, 1 inch or ⅞ inch, to improve the rate of heat flow away from the burner lips.

With a burner floor about ⅛ inch thick, the connector 1730 need not be welded in place, but can be threadedly engaged in that floor. For this purpose the floor has a connector opening punched out, the edge of that opening threaded, and the connector then threaded into it. If desired the punching out of the opening can be arranged to also draw some of the metal out around the margin of the opening and thus leave the metal edge of the cut longer than the original floor thickness. This provides a longer distance for the thread to extend over at the cut, and strengthens the threaded connection to connector 1730.

The matrix 1710 is not required to be a slip fit in the burner mouth, but can be a tight fit that calls for forcing the matrix into place with its edges squeezed against the burner walls. Such a forced insertion generally squeezes out some of the resin that may be buttered over the matrix edges, so that it is then desirable to use a little extra resin for this arrangement or to use a matrix that has its edges pre-treated with resin that is allowed to cure or partially cure, and then butter the thus cured edges with less resin.

Alternatively the matrix can be loosely cemented to the side walls while those walls are not fully bent over to their final position, and the walls subsequently bent to the final position to thus squeeze the matrix edges. Such a final bending can bring the walls a few degrees past the perpendicular so that they taper toward each other and thus lock the matrix in against being blown out by the pressure in the plenum.

The inner faces of the side walls can also be provided with cooling fins, particularly when a plenum partition is used, to further improve the transfer to heat from the side walls to the combustion mixture passing through the plenum. Such fins are readily provided by casting the burner body, and such a construction is illustrated in the burner 1800 of FIG. 18.

Burner 1800 has a matrix 1810 cemented in place at 1814 against the side wall 1812 of a burner body 1802, and seated against the upper ends of a set of fins 1831 cast in place when the body is cast.

To make sure the matrix is held in place, one or more securing rods 1820 is fitted through the matrix and received in sockets drilled laterally into the wall of mouth 1806. Where the sockets penetrate through that wall a little silicone cement can be painted over the outer face of the sockets to help guard against leakage of combustion mixture. Such securing rods are particularly helpful with burner bodies in which the side walls flare outwardly a little and are thus less expensive to cast.

Burner 1800 is also fitted with a deflector or baffle 1836 that directs the incoming combustion mixture toward the fins. Also the corners of the body 1802 are rounded so that the flow of combustion mixture sweeps along the fins in a more streamlined manner. The deflector 1836 is shown as fitted with a mounting tube 1872 that is threaded and threadedly engages in a combustion mixture inlet 1830 which is formed in the burner floor during the casting. The engagement can be locked in by a bit of cement applied so that it at least partially works its way between engaging portions of the thread and then hardens there. Tube 1872 can also have perforations 1874 to permit the combustion mixture to pass into the plenum 1804.

The thermal sheathing of FIG. 17 can be used with the construction of FIG. 18, or in place of the thermal sheathing in the construction of FIG. 3, in which event the FIG. 17 sheathing can cover the entire upper face of the hold-down frame 342, or can leave exposed a narrow width of frame edge bordering the exposed matrix face.

The cementing of the matrix edges to the side walls not only holds the matrix in place but also seals the joint between matrix and side wall, against passage of combustion mixture. Such sealing is not essential however, and the incandescent fibers can directly engage the mouth and the construction as indicated by burner 1900 in FIG. 19. The matrix 1908 can be squeezed in place so that its edges are securely engaged by teeth 1918 staked out of the side walls 1812 and the squeezed matrix is thus locked in place. Such engagement will hold a matrix in place in a plenum 6 inches wide and 12 inches long, against a combustion mixture pressure of as much as 4 inches of water column. For greater pressures or larger dimensions, a little adhesive can be applied between the matrix edge and the plenum mouth and/or screws can be threaded into the side walls from the outside of the burner with the screw shanks penetrating an inch or more into the matrix. No thermal dissipation fins nor partitioning are needed in the construction of FIG. 19 when there is no cement to protect at the matrix edge, although they can be used to keep the metal temperature low. Similarly the wall thickness at the burner mouth can be thinner than for the constructions in which the matrix is cemented in place, and here too the extra thickness will help hold the metal temperature down.

Obviously many modifications and variations of the present invention are possible in the light of the above teachings. It is therefore to be understood that within the scope of the appended claims the invention may be practiced otherwise than as specifically described.

What is claimed:

1. A gas-fired infra-red generator having a thick porous ceramic fiber matrix through the thickness of which a combustion mixture is passed to emerge from one face and to burn on that face, that matrix face being entirely uncovered so that the burning extends completely over that face, the edges of the matrix around that face being fitted in the mouth of a plenum body and adherently sealed against the inside surface of the mouth by silicone adhesive that withstands temperatures as high as about 450° F., the mouth around the adhesive being of metal sufficiently thick to carry off heat and keep its temperature low enough to thermally protect the adhesive.

2. The combination of claim 1 in which the plenum is fitted with a deflector that extends to the sides of the plenum body to guide the incoming combustion mixture to those sides to cool the sides before reaching the matrix.

3. The combination of claim 1 in which the adhesion of the matrix to the plenum body mouth is reenforced by mechanical interengagement between the two.

4. The combination of claim 1 in which the mouth of the plenum body is closely surrounded by the mouth of a cooling box having an inlet through which a cooling gas is introduced to flow out through the space between the cooling box mouth and the plenum mouth.

5. The combination of claim 4 in which thermal insulation blocks between the cooling box mouth and the plenum mouth space these mouths from each other.

6. A gas-fired infra-red generator having a thick porous ceramic fiber matrix through the thickness of which a combustion mixture is passed to emerge from one face and to burn on that face, the edges of the matrix around that face being cemented into the mouth of a plenum body with a silicone cement, and the internal surface of the plenum body having heat-dissipating fins alongside the matrix to help transfer to the combustion mixture in the plenum combustion heat absorbed by the plenum body mouth.

7. A gas-fired infra-red generator having a ceramic fiber matrix panel the edges of which are cemented to the inner face of the mouth of a combustion mixture plenum with silicone cement to cause a gaseous combustion mixture to pass from the plenum through the thickness of the panel and burn on the face of the panel from which it emerges, that face of the panel being entirely uncovered so that the burning extends completely over it, and structural securing means extends inwardly from the plenum mouth and penetrates into the panel edges to help securely hold the panel in direct contact with the mouth.

8. A gas-fired infra-red generator having a thick porous ceramic fiber matrix through the thickness of which a combustion mixture is passed to emerge from one face and to burn on that face, that matrix face being entirely uncovered so that the burning extends completely over that face, the edges of the matrix around that face being fitted in the mouth of a metal plenum body and adherently sealed against the inside surface of the mouth by silicone adhesive that withstands temperatures as high as 500° F., and the mouth of the plenum body is closely surrounded by the mouth of a cooling box having an inlet through which a cooling gas is introduced to flow out through the space between the cooling box mouth and the plenum mouth.

* * * * *